United States Patent Office 3,396,029
Patented Aug. 6, 1968

3,396,029
HARDENING OF PHOTOGRAPHIC PROTEIN-CONTAINING LAYERS BY ACROLEIN POLYMERS CONTAINING CARBOXYLIC GROUPS
Wolfgang Himmelmann, Cologne-Stammheim, Alexander Riebel, Leverkusen, and Erwin Alfons Müller, Leverkusen-Schlebusch, Germany, assignors to Agfa Aktiengesellschaft, Leverkusen, Germany, a corporation of Germany
No Drawing. Filed June 8, 1964, Ser. No. 373,554
Claims priority, application Germany, June 14, 1963, A 43,323
7 Claims. (Cl. 96—111)

ABSTRACT OF THE DISCLOSURE

This invention relates to the hardening of photographic protein-containing layers particularly of gelatin layers to improve their resistance to water, by incorporating therein an acrolein polymer containing carboxylic groups. The polymer can be a copolymer of acrolein with an alpha, beta-unsaturated carboxylic acid such as acrylic acid, methacrylic acid or maleic acid, or it can be an acrolein homopolymer in which some of the aldehyde groups have been converted to carboxylic groups.

---

A protein preferably gelatin is used as a binding agent for photographic layers such as light-sensitive silver halide emulsion layers, auxiliary layers, antistatic and protective layers and the like. Photographic materials containing such proteinaceous layers are subjected in the course of the photographic processing to treatment with aqueous baths which often vary in pH or which may have raised temperatures. There has been a great deal of work done with respect to the improvement of the resistance of gelatin to water so that swelling or melting of the gelatin does not occur during the photographic processing or hot drying operations.

Compounds which have principally been found as being useful for treating gelatin to prevent swelling and melting thereof under photographic processing conditions may be classified as follows:

(1) Metallic salts such as of chromium, aluminium or zirconium;
(2) Aldehydes or dialdehydes such as formaldehyde or mucochloric acid;
(3) 1,2- or 1,4-diketones such as cyclohexane-1,2-dione;
(4) Quinones;
(5) High-molecular hardening agents such as oxidation products of starch and semiesters of maleic acids with polyvinyl alcohol, or water soluble bisulfite compounds of polyacrolein.

These hardening agents have in many instances exhibited undesired photographic effects of one kind or another. For instance, hardeners of the aldehyde type sometimes have a propensity to the formation of increased fog.

Furthermore, often the hardeners cause loss of speed of an emulsion upon storage. It is generally required that a hardening agent which is to be used in photographic materials will not adversely affect the characteristics of a photographic emulsion. For example, hardeners of the metallic salt type tend to cause an increase in the brittleness of the layers. Dialdehydes and diketones sometimes cause an unwanted coloring of the photographic layers.

It is an object of our invention to provide a hardening agent for proteinaceous photographic layers, in particular gelatin layers, which shows no detrimental photographic effects. Another object is to provide photographic materials, the layers of which are hardened by incorporating the hardening agents therein. Another object is to provide proteinaceous coating compositions, in particular gelatin compositions from which coatings may be prepared, which are resistant to the effect of water of varying pH or elevated temperatures. Other objects and advantages, some of which are specifically referred to hereinafter, are apparent to those skilled in the art which this invention pertains.

We have found that proteins in particular gelatin are rendered resistant to water even at elevated temperatures and that the mechanical properties of proteinaceous layers are improved by incorporating therein a polymer of acrolein containing carboxylic groups. The following polymers exhibit particular utility:

I. Copolymers containing about 50 to 95 parts by weight of acrolein and about 5 to 50 parts by weight of a copolymerizable carboxylic acid which contains an olefinic double bond in the α-position to the carboxylic group, such as acrylic acid, methacrylic acid or maleic acid. Preferred are copolymers containing 80 to 95 parts by weight of acrolein and 5 to 20 parts by weight of acrylic acid and/or methacrylic acid.

II. Polymers containing recurring units of the following formula:

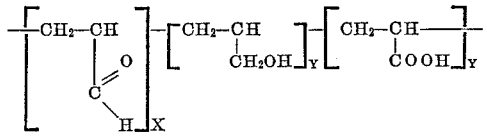

wherein:
X has a value of 10 and
Y is an integer between 1 and 50.

These polymers are obtained by Cannizzaro reaction of polyacrolein with alkaline agents in particular sodium hydroxide.

The polymers of the present invention are soluble without decomposition in aqueous sodium bicarbonate or sodium carbonate solution, to form stable, aqueous solutions of polymeric hardening agents. In this respect the hardening agents of the present invention are especially advantageous as compared with bisulfite compounds of polyacrolein, the aqueous solutions of which contain sulfite-ions and free sulfur dioxide by which the photographic characteristics of the element are sometimes deleteriously affected.

The advantage of these hardening agents is particularly apparent with the layers for the silver salt diffusion process, where it is frequently desired to apply a diffusion-resistant hardening agent in one of the layers, so that an additional anchorage is produced at the boundary between the layer surface containing the hardening agent and adjacent protein-containing layer.

Although the hardening agents of our invention render gelatin resistant to water, gelatin layers treated therewith remain swellable to a certain degree. This unexpected effect is particularly advantageous for photographic layers which are to be used in the silver salt diffusion process, since the diffusion of the silver salts is accelerated by the swelling.

The preparation of the polymers to be used according to the invention can be performed by standard methods either by free radical copolymerisation with, for example, potassium peroxydisulfate in an aqueous medium, or by reacting aqueous solutions of the monomers with the aid of a Redox system, for example, with the system potassium persulfate-silver nitrate. Such methods are described in Houben-Weyl, vol. 14/1, page 1086 (Methoden der organischen Chemie, 4th edition, 1961 (Thieme-Verlag, Stuttgart).

In using the hardening agents of the invention in aqueous gelatin compositions, it is desirable that the hardening agents first dissolved in an appropriate solvent and added to the gelatin composition in the form of a solution. The solvent used for incorporating the hardening agent into photographic protein compositions should have no deleterious effect thereon. The hardening agents of the invention are preferably used in the form of aqueous solutions. These solutions are prepared by dissolving the copolymers in aqueous solutions of alkali metal bicarbonates or alkali metal carbonates at ordinary or elevated temperature and thereafter adjusting the pH to 6 or 7. The copolymers can also be dissolved by heating in alcohols, advantageously n-butanol, and then such solutions emulsified into the proteinaceous compositions.

Although some hardening effect is observed when the acrolein polymers are used in the gelatin coating compositions in an amount of about 0.1% or less by weight based on dry protein, it is preferred to apply between 0.5 and 4% by weight based on dry gelatin. If another protein is used, such as casein, it can be advantageous to increase the percentage of hardening agent.

The hardening agent of the invention can be added to any photographic layer such as auxiliary layers, antistatic layers, protective layers or preferably light-sensitive silver halide emulsion layers. The compositions in which our hardening agents are incorporated may be coated on any type of support such as another proteinaceous photographic layer or a transparent support of a cellulose ester, a polycarbonate particularly bis-hydroxy phenyl alkanes, polyesters polyethylene terephthalate and the like. The silver halide emulsion to which the hardening agent is added may be sensitized or otherwise treated in its manufacture as is conventional for silver halide gelatin emulsions. The hardeners of the invention are operative in various kinds of photographic emulsions containing proteinaceous binding agents in particular gelatin. The hardening agents are useful in emulsions which are not additionally sensitized, they are also useful in optically sensitized emulsions. They may be incorporated into emulsions before or after any sensitizing dyes or other ingredients are added. Various silver salts may be used as light-sensitive compounds such as silver chloride, silver bromide or mixtures thereof which may contain up to 10 mol percent of silver iodide. The hardening agents of the invention may be used in emulsions intended for use in color photography, black-and-white photography, X-ray photography or in the silver salt diffusion process or any other transfer process.

Example 1

78 g. of a copolymer of acrolein and acrylic acid which contains 90 parts by weight of acrolein and 10 parts by weight of acrylic acid are dissolved in 1 liter of a 9% aqueous solution of sodium bicarbonate. Thereafter the solution is adjusted to pH 6.

Various quantities of the above solution are added at a pH of 5 to a silver chlorobromo emulsion containing 80 g. of gelatin per liter.

These silver chlorobromide gelatin emulsions containing the amount of the copolymer as specifically indicated in the following table were coated on a cellulose acetate support. The resulting photographic materials were kept for 24 hours, some at room temperatures and others at 50° C. After exposure, development in a usual black-and-white developer composition, fixing with a sodium thiosulfate solution and final rinsing, the melting points and the photographic characteristics such as speed, fog and γ-value were established.

| Added hardener, based on the gelatin | Melting points in ° C. of the various emulsion layers | | | |
| --- | --- | --- | --- | --- |
| | 0% | 0.5% | 1% | 2% |
| Melting point after being kept (24 hours) at room temperature | 35 | 45 | 60 | 62 |
| Melting point after being kept (24 hours) at 50° C | 35 | 52 | >100 | >100 |
| Melting point after processing | 35 | 48 | >100 | >100 |

For measuring the melting point the supported emulsion layer was immersed in water and the water was heated. The emulsion layer according to the invention will cling to the support until a temperature is reached that causes the emulsion to melt, thereby separating from the emulsion support.

Photographic characteristics such as speed, fog and γ-value have not altered as compared with the control sample.

Example 2

In each case, 1 liter of a silver chlorobromide emulsion according to Example 1 is adjusted to pH values of 5, 7 and 9 and then different quantities of solutions of an acrolein-acrylic acid copolymer in sodium bicarbonate (pH 6–7) are added thereto while stirring. The kinds and the amount of hardening agent based on dry gelatin added in each case and the melting points of the resulting layers are specifically indicated in the following table. The melting points are determined after casting and drying.

The procedure described in the foregoing sample was followed.

(a) Acrolein-Acrylic Acid Copolymer (Monomer Ratio 60:40)

| Added quantity 0.5%: | | | |
| --- | --- | --- | --- |
| pH value of the emulsion | 5 | 7 | 9 |
| Layer melting point after being kept (24 hours) at room temperature | 42 | 55 | 58 |
| Added quantity, 1%: | | | |
| pH value of the emulsion | 5 | 7 | 9 |
| Layer melting point after being kept (24 hours) at room temperature | >100 | >100 | >100 |
| Added quantity, 2%: | | | |
| pH value of the emulsion | 5 | 7 | 9 |
| Layer melting point after being kept (24 hours) at room temperature | >100 | >100 | >100 |

(b) Acrolein-Acrylic Acid Copolymer (Monomer Ratio 70:30)

| Added quantity, 0.5%: | | | |
| --- | --- | --- | --- |
| pH value of the emulsion | 5 | 7 | 9 |
| Layer melting point after being kept (24 hours) at room temperature | 40 | 52 | 75 |
| Added quantity, 1%: | | | |
| pH value of the emulsion | 5 | 7 | 9 |
| Layer melting point after being kept (24 hours) at room temperature | >100 | >100 | >100 |

(c) Acrolein-Acrylic Acid Copolymer (Monomer Ratio 90:10)

| Added quantity, 0.5%: | | | |
| --- | --- | --- | --- |
| pH value of the emulsion | 5 | 7 | 9 |
| Layer melting point after being kept (24 hours) at room temperature | 45 | 45 | 48 |
| Added quantity, 1%: | | | |
| pH value of the emulsion | 5 | 7 | 9 |
| Layer melting point after being kept (24 hours) at room temperature | 60 | >100 | >100 |
| Added quantity, 2%: | | | |
| pH value of the emulsion | 5 | 7 | 9 |
| Layer melting point after being kept (24 hours) at room temperature | 62 | >100 | >100 |

The melting points of all layers are unaffected by boiling after the processing as in Example 1. The emulsion layers show increasing swelling values with increasing content of acrylic acid in the hardening agent.

(d) Acrolein-Maleic Acid Anhydride Copolymer (Monomer Ratio 50:50)

| Added quantity, 2%: | | | |
| --- | --- | --- | --- |
| pH value of the emulsion | 5 | 7 | 9 |
| Layer melting point after being kept 24 hours at 50° C | 42 | 52 | 60 |
| Added quantity, 3%: | | | |
| pH value of the emulsion | 5 | 7 | 9 |
| Layer melting point after being kept 24 hours at 50° C | 100 | 100 | 100 |

The above copolymer was prepared as follows:

63 g. of maleic anhydride powder and 0.5 g. of benzoylperoxide are dissolved in 750 ml. of dry benzene and heated in a nitrogen atmosphere at a temperature of 80° C. Thereafter 36 g. of distilled acrolein are added and the resulting reaction mixture is refluxed for 50–60 hours while stirring and while continuously introducing nitrogen. The copolymer which precipitates, is suction filtered after cooling, washed with benzene and dried. The resulting product is soluble in aqueous filtered sodium carbonate solution.

Example 3

To 170 ml. of a neutral 6% casein solution containing the additives which are necessary for the production of a transfer layer for the silver salt diffusion process, such as finely distributed metallic silver as developing nuclei, a silver halide solvent such as sodium thiosulfate and also adhesion-preventing substances of high or low molecular weight, there is added 1 ml. of a neutral 10% aqueous solution of the sodium salt of an acrolein-acrylic copolymer (monomer ratio 90:10). After casting onto ordinary or baryta-coated paper and drying, the transfer material so made is brought into contact with an exposed negative silver halide emulsion layer in a continuously working developing apparatus which contains an alkaline developer, the transfer layer is then separated from the silver halide emulsion layer after being in contact for a short time. The transfer layer now containing the positive silver image is resistant to wiping and smearing, contrary to an unhardened casein layer processed in identical manner.

A similar result was obtained with an acrolein-acrylic acid copolymer having a monomer ratio of 80:20.

Example 4

The same additives as in Example 3 are incorporated into 170 ml. of a 6% gelatin solution. The transfer layer thus obtained is processed as indicated in Example 3. The resulting transfer layer containing the silver image is resistant to boiling water, wiping and smearing.

Example 5

Example 4 was repeated but with addition of 1 ml. of a 10% aqueous neutral solution of the sodium salt of an acrolein-acrylic acid copolymer (monomer ratio 70:30). After processing, the transfer layer is resistant to wiping, smearing and boiling water but has a higher swelling power than the layer obtained according to Example 4.

Example 6

0.52 g. of acrolein-acrylic acid copolymer (monomer ratio 90:10) are dissolved in 6 g. of n-butanol by refluxing for a short time and then 2 g. of phthalic acid dibutyl ester are added. The solution thus obtained is incorporated by means of a high-speed turbo-type stirrer into one of the casting solutions referred to in Examples 3–5 instead of the aqueous solution of the acrolein-acrylic acid copolymers. After processing, the transfer layer has a melting point of above 100° C., and is resistant to wiping and smearing.

Example 7

0.52 g. of an acrolein-methacrylic acid copolymer (monomer ratio 70:30) are dissolved in 6 g. of n-butanol by refluxing for a short time and 2 g. of phthalic acid dibutyl ester are added. The solution obtained is incorporated, as indicated in Example 6, into one of the casting solutions mentioned in Examples 3 to 5, instead of the aqueous solutions of the acrolein-acrylic acid copolymers. The resulting transfer layers containing a positive silver image have a melting point of above 100° C. and are resistant to wiping and smearing.

Example 8.—Preparation of a polymer of the type II (a) Preparation of a polyacrolein.—To a mixture of 250 ml. of water and 3 cc. of 1-normal aqueous solution of sodium hydroxide are added dropwise 22 g. of acrolein while stirring, at a temperature of 0° C. After a short time the solution becomes slightly yellowish and cloudy. Stirring is continued for 1 hour at 0° C. The polyacrolein is precipitated by adding saturated aqueous sodium chloride solution. The polymeric product is suction filtered, washed with water several times and dried. Yield: 13 g., soluble in methanol and ethanol, insoluble in water.

(b) Cannizzaro reaction.—11 g. of the above polyacrolein are dissolved in 150 g. of methanol and mixed with such an amount of water that a precipitate just appears. The mixture is heated to a temperature of 60° C. and a solution of 2 g. sodium hydroxide of 10 cc. of water is added thereto. After a reaction time of 5 minutes, the reaction mixture is neutralized by the addition of aqueous hydrochloric acid. After evaporating the methanol in vacuo, a water-soluble polymeric product is obtained which contains acrolein, allyl alcohol and acrylic acid units. The concentration of carboxylic groups is 15 mol percent.

The copolymer in the form of a 10% aqueous solution, is added to a silver chloro bromide emulsion as described in Example 1. The resulting layers are resistant to the effect of boiling water and to wiping and smearing.

Example 9.—Preparation of the hardening agent 20 g. of a powdered polyacrolein, prepared by Redox-polymerisation with potassium persulfate and silver nitrate as described in "Methoden der organischen Chemie" (Houben-Weyl, 4th edition, 1961, published by Thieme Verlag, Stuttgart, vol. 14, part 1, page 1086) are suspended in 200 ml. of water. A pH of 14 is obtained by the addition of concentrated aqueous sodium hydroxide solution and that mixture is heated by vigorously stirring to boiling, care being taken that the pH does not decrease below 12; after some hours most of the polyacrolein is dissolved, it is filtered through bleaching earth and the filtrate acidified with diluted aqueous hydrochloric acid. The precipitate is suction-filtered, washed with water until the pH of the water is neutral and dried. The resulting product is soluble in diluted aqueous hydroxide solution. The carbo-oxyl content is 11.5 mol percent. Yield: 50 g.

The hardening agent so made is applied as disclosed in Example 5 with the exception that 5 ml. of a 10% aqueous neutral solution of the sodium salt of this agent (the acrolein-acrylic acid-allyl alcohol-copolymer) are added to the photographic layer. After processing that layer is fast to wiping and boiling.

Alternative preparation of the hardening agents.—7 g. of potassium peroxy disulphate, 5 g. of distilled acrylic acid and 45 g. of acrolein are dissolved at 25° C. in 500 ml. of water in a 1-liter three-necked round-bottom flask equipped with a stirrer device, a reflux condenser thermometer and dropping funnel.

While stirring, a solution of 4.5 g. of silver nitrate in 20 ml. of water is added dropwise within 1 hour at 25° C.

With the commencement of the addition, the reaction mixture becomes yellowish and, after 5 minutes, slightly cloudy. The temperature of the solution rises and should if required be kept at a temperature between 25° C. and 40° C. by cooling with water. After completing the addition, stirring is continued for 1½ hours at room temperature, the mixture quickly suctioned filtered and the residue washed with a large quantity of water until free from nitrate ions. The still moist precipitate is incorporated by stirring into a solution of 3 g. of sodium thiosulfate (crystalline) and 1800 ml. of water and left overnight in the dark. It is again sharply suction filtered, washed with considerable water until free from thio-sulfate ions and the resulting copolymer is dried in the air. Yield=39 g.

Other copolymers can be prepared in analogous manner by variation of the proportions of the copolymersation components or by using other copolymerisable carboxylic acids such as methacrylic acid.

We claim:

1. An aqueous emulsion of a water-soluble film-forming protein hardenable by aldehydes, said emulsion containing in dissolved form a polyvinyl-type acrolein polymer having a multiplicity of aldehyde groups and carboxyl groups directly connected to the polyvinyl chain, the proportion of carboxyl groups to aldehyde groups corresponding to that produced when copolymerizing 50 to 95 parts by weight of acrolein with 5 to 50 parts by weight of a carboxylic acid having a double bond alpha to the carboxyl group.

2. The combination of claim 1 in which the protein is gelatin.

3. A photographic protein emulsion layer in which the emulsion is that of claim 1.

4. The combination of claim 3 in which the polymer is a copolymer of acrolein with a carboxylic acid having a double bond alpha to the carboxyl group.

5. The combination of claim 4 in which the acid is acrylic acid, methacrylic acid or maleic acid.

6. The combination of claim 3 in which the polymer is a homopolymer some of whose aldehyde groups have been converted to carboxy groups.

7. The combination of claim 4 in which the polymer is a copolymer of 80 to 95 parts by weight of acrolein with 5 to 20 parts by weight of acrylic acid or methacrylic acid.

References Cited

UNITED STATES PATENTS 3,226,234   12/1965   Himmelmann _____ 96—111

FOREIGN PATENTS 1,156,649   10/1963   Germany.

NORMAN G. TORCHIN, *Primary Examiner.*

R. E. FICHTER, *Assistant Examiner.*